US010895223B2

(12) United States Patent
Dayton

(10) Patent No.: US 10,895,223 B2
(45) Date of Patent: Jan. 19, 2021

(54) VAPOR IMPERMEABLE SOLENOID FOR FUEL VAPOR ENVIRONMENT

(71) Applicant: Eaton Corporation, Cleveland, OH (US)

(72) Inventor: Robert Andrew Dayton, Attica, MI (US)

(73) Assignee: Eaton Corporation, Cleveland, OH (US)

(*) Notice: Subject to any disclaimer, the term of this patent is extended or adjusted under 35 U.S.C. 154(b) by 94 days.

(21) Appl. No.: 16/160,462

(22) Filed: Oct. 15, 2018

(65) Prior Publication Data

US 2019/0048829 A1 Feb. 14, 2019

Related U.S. Application Data

(63) Continuation-in-part of application No. PCT/US2017/027730, filed on Apr. 14, 2017.
(Continued)

(51) Int. Cl.
*F02M 25/08* (2006.01)
*B60K 15/03* (2006.01)
(Continued)

(52) U.S. Cl.
CPC ............ *F02M 25/08* (2013.01); *B60K 15/03* (2013.01); *B60K 15/035* (2013.01);
(Continued)

(58) Field of Classification Search
CPC .. F02M 25/08; F02M 25/0836; F02M 25/089; F02M 2025/0845; F16K 31/02;
(Continued)

(56) References Cited

U.S. PATENT DOCUMENTS 4,882,558 A * 11/1989 Takayanagi ............... H01F 7/06
335/260
5,467,962 A * 11/1995 Bircann ................. F02M 26/53
251/129.15
(Continued)

FOREIGN PATENT DOCUMENTS

CN 103314190 A 9/2013
CN 203374938 U 1/2014
(Continued)

OTHER PUBLICATIONS

Supplementary European Search Report for EP Application No. 17 79 3293 dated Nov. 19, 2019.
(Continued)

*Primary Examiner* — John M Zaleskas
(74) *Attorney, Agent, or Firm* — RMCK Law Group PLC

(57) ABSTRACT

A vapor impermeable solenoid includes an outer housing fabricated from a vapor impermeable material configured to prevent fuel vapor molecules from passing therethrough; windings configured to generate a magnetic flux when energized, a flux collector configured to direct the magnetic flux, a pole piece, and a magnetic armature disposed within the housing and coupled to a seal configured to selectively seal a passage that allows fuel vapor to pass to a purge canister. The magnetic armature is configured to move from a first position to a second position when an electric current is applied to the windings.

20 Claims, 7 Drawing Sheets

Related U.S. Application Data

(60) Provisional application No. 62/350,309, filed on Jun. 15, 2016, provisional application No. 62/323,356, filed on Apr. 15, 2016.

(51) Int. Cl.
  *B60K 15/035* (2006.01)
  *F16K 31/02* (2006.01)
  *H01F 7/08* (2006.01)
  *H01F 7/129* (2006.01)
  *H01F 7/16* (2006.01)
  *H01F 27/29* (2006.01)
  *H01F 27/32* (2006.01)

(52) U.S. Cl.
  CPC ..... *B60K 15/03519* (2013.01); *F02M 25/089* (2013.01); *F16K 31/02* (2013.01); *H01F 7/081* (2013.01); *H01F 7/129* (2013.01); *H01F 7/1607* (2013.01); *H01F 27/29* (2013.01); *H01F 27/325* (2013.01); *B60K 2015/03302* (2013.01); *F02M 2025/0845* (2013.01); *H01F 2007/086* (2013.01)

(58) Field of Classification Search
  CPC ...... F16K 31/0655; H01F 7/081; H01F 7/129; H01F 7/1607; H01F 2007/086; H01F 27/325; B60K 15/03302; B60K 15/035; B60K 15/03519
  USPC .............. 123/518, 520; 251/129.15
  See application file for complete search history.

(56) References Cited

U.S. PATENT DOCUMENTS

| | | | | |
|---|---|---|---|---|
| 5,494,255 | A * | 2/1996 | Pearson | F02M 26/48 123/568.26 |
| 5,649,687 | A * | 7/1997 | Rosas | F02M 25/0836 251/129.05 |
| 5,685,519 | A * | 11/1997 | Bircann | F16K 31/0655 251/129.15 |
| 5,687,698 | A * | 11/1997 | Mastro | H01F 7/1607 123/568.26 |
| 5,788,213 | A * | 8/1998 | Kanda | H01F 7/1607 251/129.02 |
| 5,878,779 | A * | 3/1999 | Bircann | F02M 26/53 123/568.26 |
| 6,209,529 | B1 * | 4/2001 | Everingham | F02D 21/08 123/568.2 |
| 6,247,456 | B1 | 6/2001 | Everingham et al. | |
| 6,450,152 | B1 | 9/2002 | Everingham | |
| 6,498,558 | B1 * | 12/2002 | Linkner, Jr. | B60T 8/3615 336/110 |
| 6,772,743 | B2 * | 8/2004 | Nydam | F02M 26/53 123/568.21 |
| 6,903,647 | B2 * | 6/2005 | Linkner, Jr. | B60T 8/3615 29/602.1 |
| 6,918,571 | B1 * | 7/2005 | Rose | F16K 31/0613 251/129.15 |
| 7,422,193 | B2 | 9/2008 | Sisk et al. | |
| 8,231,104 | B2 | 7/2012 | Voss | |
| 8,256,393 | B2 | 9/2012 | Simpson et al. | |
| 9,068,482 | B2 | 6/2015 | Methley | |
| 9,163,746 | B2 | 10/2015 | Voss et al. | |
| 9,324,488 | B2 | 4/2016 | Dayton | |
| 9,423,046 | B2 | 8/2016 | Bamber et al. | |
| 9,500,291 | B2 | 11/2016 | Pifer et al. | |
| 9,587,748 | B2 | 3/2017 | Taguchi | |
| 9,790,831 | B2 | 10/2017 | Stang | |
| 2001/0017160 | A1 * | 8/2001 | Ishigaki | B60K 15/03504 137/520 |
| 2001/0017360 | A1 * | 8/2001 | Watanabe | F16K 31/0655 251/129.17 |
| 2002/0104979 | A1 * | 8/2002 | Kato | F02M 25/0836 251/129.17 |
| 2002/0112702 | A1 * | 8/2002 | Weldon | F16K 24/04 123/520 |
| 2004/0105209 | A1 | 6/2004 | Gerlich et al. | |
| 2005/0061302 | A1 * | 3/2005 | Tatsu | F02M 25/0836 123/520 |
| 2005/0166979 | A1 * | 8/2005 | Berger | F23N 1/005 137/630.15 |
| 2005/0217734 | A1 * | 10/2005 | Takakura | F16K 24/04 137/587 |
| 2006/0145113 | A1 * | 7/2006 | Dayton | F16K 31/0613 251/129.15 |
| 2006/0185652 | A1 * | 8/2006 | Tsuge | F02M 25/0836 123/519 |
| 2006/0185735 | A1 * | 8/2006 | Tsuge | F02M 25/0836 137/495 |
| 2007/0151614 | A1 * | 7/2007 | Dayton | F16K 11/0708 137/625.65 |
| 2008/0216899 | A1 * | 9/2008 | Moreno | F16K 31/0637 137/219 |
| 2010/0156582 | A1 * | 6/2010 | Zelmer | F16H 63/3475 335/261 |
| 2010/0269921 | A1 * | 10/2010 | Pifer | F16K 17/0413 137/487.5 |
| 2010/0294966 | A1 * | 11/2010 | Czimmek | F02B 37/16 251/129.15 |
| 2011/0162728 | A1 * | 7/2011 | Pifer | F16K 31/0689 137/487.5 |
| 2011/0240145 | A1 * | 10/2011 | Pifer | F16K 17/0413 137/487.5 |
| 2011/0284781 | A1 * | 11/2011 | Keller | F02M 25/0836 251/129.15 |
| 2012/0055943 | A1 * | 3/2012 | Muller-Riederer | F16K 24/04 220/745 |
| 2013/0009083 | A1 * | 1/2013 | Ozaki | H01F 7/1607 251/129.15 |
| 2013/0112290 | A1 * | 5/2013 | Gerlich | F16K 39/024 137/487.5 |
| 2014/0264113 | A1 * | 9/2014 | Grover | F16K 31/0655 251/129.15 |
| 2014/0331976 | A1 * | 11/2014 | Tsumoto | F02M 25/0836 123/519 |
| 2015/0000772 | A1 * | 1/2015 | Onodera | B60K 15/03519 137/599.01 |
| 2015/0027571 | A1 * | 1/2015 | Kishi | F16K 15/18 137/614.2 |
| 2015/0048270 | A1 * | 2/2015 | Bamber | H01F 3/00 251/129.15 |
| 2015/0061799 | A1 * | 3/2015 | Dayton | H01F 7/081 335/280 |
| 2015/0096633 | A1 * | 4/2015 | Pifer | F16K 31/0624 137/599.11 |
| 2015/0096636 | A1 * | 4/2015 | Dayton | F16K 11/0716 137/625.64 |
| 2015/0101577 | A1 * | 4/2015 | Balsdon | F02M 25/089 123/520 |
| 2015/0101677 | A1 * | 4/2015 | Balsdon | F02M 25/0836 137/198 |
| 2015/0101689 | A1 * | 4/2015 | Balsdon | F02M 25/0818 137/551 |
| 2015/0102039 | A1 * | 4/2015 | Balsdon | F02M 25/089 220/562 |
| 2015/0144819 | A1 * | 5/2015 | Pifer | F16K 39/024 251/129.15 |
| 2015/0345652 | A1 * | 12/2015 | Jefford | F16K 31/082 251/129.15 |
| 2016/0033046 | A1 | 2/2016 | Taguchi | |
| 2016/0123490 | A1 * | 5/2016 | McLauchlan | F16K 31/0675 137/15.18 |
| 2017/0074745 | A1 * | 3/2017 | Ambrose | G01M 3/02 |

FOREIGN PATENT DOCUMENTS

| | | |
|---|---|---|
| WO | 2016106310 A1 | 6/2016 |
| WO | 2017181084 A1 | 10/2017 |

(56) References Cited

FOREIGN PATENT DOCUMENTS

OTHER PUBLICATIONS

International Search Report and Written Opinion of International Application No. PCT/US2017/027730 dated Sep. 19, 2017, 13 pages.

* cited by examiner

VAPOR IMPERMEABLE SOLENOID FOR FUEL VAPOR ENVIRONMENT

CROSS-REFERENCE TO RELATED APPLICATIONS

This application is a continuation-in-part of International Application No. PCT/US2017/027730 filed Apr. 14, 2017, which claims the benefit of U.S. Provisional Application No. 62/323,356, filed Apr. 15, 2016, and U.S. Provisional Application No. 62/350,309, filed Jun. 15, 2016, the contents of which are incorporated herein by reference thereto.

FIELD

The present disclosure relates generally to vehicle fuel tank systems and, more particularly, to a fuel tank isolation valve assembly having a vapor impermeable solenoid assembly.

BACKGROUND

Some vehicles include specifically designed evaporative emissions systems to prevent fuel vapors from escaping a fuel system of the vehicle. In some systems, valves are utilized to prevent fuel vapors from venting directly to the atmosphere. In typical evaporative emissions systems, vented vapors from the fuel system are directed to a purge canister containing activated charcoal. The activated charcoal can be extremely porous, which provides a large surface area for adsorption of fuel vapors and/or chemical reactions. During some engine operational modes, with the help of specifically designed control valve, the fuel vapors are adsorbed within the canister. Subsequently, during other engine operational modes, and with additional control valves, fresh air is dawn through the canister to pull the stored fuel vapor into the engine for combustion thereof.

In hybrid vehicles having both electric and gas engines, the electric engine may be used for extended periods of time and the purge canister may be become overwhelmed by fuel vapor. A fuel tank isolation valve assembly may be utilized to prevent fuel vapors from traveling to and overwhelming the purge canister. While such systems work for their intended purpose, there remains a need for an improved fuel tank isolation valve assembly.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to various aspects of the present disclosure a vapor impermeable solenoid for a fuel tank isolation valve assembly is provided. The vapor impermeable solenoid includes an outer housing fabricated from a vapor impermeable material configured to prevent fuel vapor molecules from passing therethrough, windings configured to generate a magnetic flux when energized, a flux collector configured to direct the magnetic flux, a pole piece, and a magnetic armature disposed within the housing and coupled to a seal configured to selectively seal a passage that allows fuel vapor to pass to a purge canister. An armature tube is disposed inboard of the flux collector and is formed of magnetic material. The magnetic armature is configured to move from a first position to a second position when an electric current is applied to the windings.

In addition to the foregoing, the described vapor impermeable solenoid may include one or more of the following features: wherein the first position is a sealed position preventing flow of the fuel vapor to the purge canister, and the second position is an unsealed position allowing flow of the fuel vapor to the purge canister; wherein the magnetic armature includes a first end having a generally frustoconical shape; wherein the magnetic armature includes a second end having an arm extending therefrom, and a seal coupled to the arm, the seal configured to selectively block a passage to prevent fuel vapor from passing through the passage; an encapsulated coil assembly that includes the windings; wherein the encapsulated coil assembly further includes a bobbin having an armature portion and a terminal portion; wherein the windings are disposed about the armature portion, and a terminal is coupled to the terminal portion, the terminal electrically coupled to the windings; a voltage suppressor disposed within a recess formed in the terminal portion; an encapsulation material disposed about and at least partially encapsulating the windings, the bobbin, and the terminal; an armature tube disposed inboard of the bobbin and the flux collector; wherein the pole piece is disposed inside the armature tube; wherein the magnetic armature includes at least one groove formed therein configured to receive a bearing to facilitate sliding movement of the magnetic armature within the armature tube; wherein the outer housing is a metal liner configured to prevent fuel vapor molecules from passing therethrough.

According to various aspects of the present disclosure a fuel tank isolation valve assembly for a fuel tank system having a fuel tank coupled to a purge canister via a fuel vapor vent line is provided. The fuel tank isolation valve assembly includes a vent passage having a vapor inlet port and a vapor outlet port, and a vapor impermeable solenoid assembly operably coupled to the vent passage. The vapor impermeable solenoid assembly includes an outer housing fabricated from a vapor impermeable material configured to prevent fuel vapor molecules from passing therethrough, windings configured to generate a magnetic flux when energized, a flux collector configured to direct the magnetic flux, a pole piece, and a magnetic armature disposed within the housing and coupled to a seal configured to selectively seal a passage that allows fuel vapor to pass to a purge canister, the magnetic armature configured to move from a first position to a second position when an electric current is applied to the windings.

In addition to the foregoing, the described fuel tank isolation valve assembly may include one or more of the following features: wherein the first position is a sealed position preventing flow of the fuel vapor to the purge canister, and the second position is an unsealed position allowing flow of the fuel vapor to the purge canister; wherein the magnetic armature includes a first end having a generally frustoconical shape, a second end having an arm extending therefrom, and a seal coupled to the arm, the seal configured to selectively block the vent passage to prevent fuel vapor from passing through the vent passage; and an encapsulated coil assembly that includes the windings, a bobbin having an armature portion and a terminal portion, and an encapsulation material disposed about and at least partially encapsulating the windings, the bobbin, and the terminal, the windings being disposed about the armature portion, and a terminal is coupled to the terminal portion, the terminal electrically coupled to the windings; an armature tube disposed inboard of the bobbin and the flux collector, wherein the pole piece is disposed inside the armature tube, wherein the magnetic armature includes at least one groove formed therein configured to receive a bearing to facilitate sliding movement of the magnetic armature within the armature tube; and wherein the outer housing is a metal liner configured to prevent fuel vapor molecules from passing therethrough.

According to various aspects of the present disclosure a vehicle fuel tank system is provided. The vehicle fuel tank system includes a fuel tank, a purge canister, a conduit fluidly coupling the fuel tank and the purge canister, and a fuel tank isolation valve assembly disposed within the conduit and configured to selectively fluidly isolate the fuel tank from the purge canister. The valve assembly includes a vent passage having a vapor inlet port and a vapor outlet port, and a vapor impermeable solenoid assembly operably coupled to the vent passage. The vapor impermeable solenoid assembly includes an outer housing fabricated from a vapor impermeable material configured to prevent fuel vapor molecules from passing therethrough, windings configured to generate a magnetic flux when energized, a flux collector configured to direct the magnetic flux, a pole piece, and a magnetic armature disposed within the housing and coupled to a seal configured to selectively seal a passage that allows fuel vapor to pass to a purge canister, the magnetic armature configured to move from a first position to a second position when an electric current is applied to the windings.

BRIEF DESCRIPTION OF THE DRAWINGS

The present disclosure will become more fully understood from the detailed description and the accompanying drawings, wherein.

DETAILED DESCRIPTION

The present teachings provide for the prevention of vapor permeation in an inner cavity of a solenoid. In one example, the solenoid is constructed in such a way as to be lined with a deep-drawn metal liner, as shown in accordance with the present teachings in FIGS. 1-6. It will be appreciated in light of the disclosure that fuel vapor molecules cannot pass through the metal liner. Because the interior cavity of the solenoid can be constructed to be exposed to fuel vapor, there are many further circumstances where the solenoid must also be constructed so that vapor cannot escape. Were the fuel vapors to permeate the device, undesirably, the fuel vapors could further escape into the atmosphere.

It will also be appreciated in light of the disclosure that there can be several ways to form a fuel vapor permeation barrier, however many such constructions are not magnetically efficient and therefore can require additional copper windings to ensure the same performance. Accordingly, the present teachings can be shown to provide the needed performance without additional copper windings while preventing permeation of fuel vapor outside the solenoid.

Figure 1:
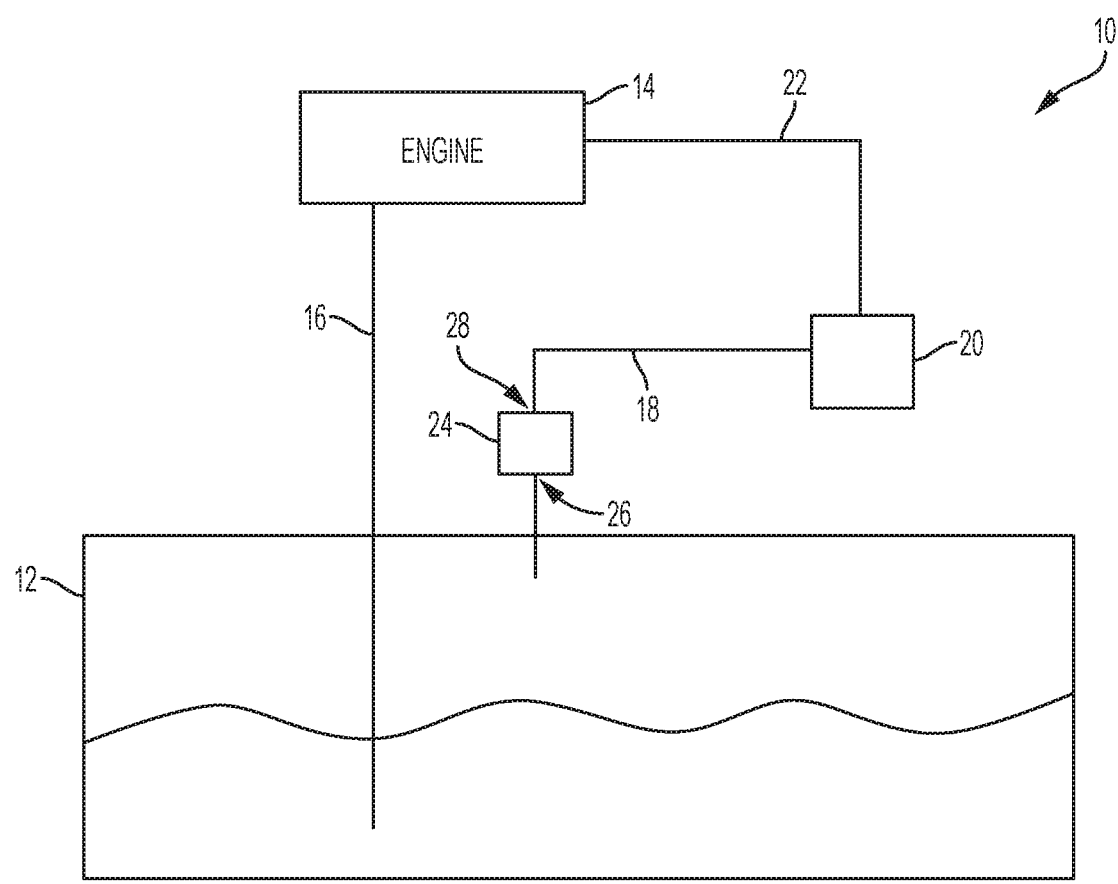
FIG. 1 is a schematic illustration of a fuel tank system constructed in accordance to one example of the present disclosure.

With initial reference to FIG. 1, a fuel tank system constructed in accordance to one example of the present disclosure is shown and generally identified at reference 10. The fuel tank system 10 can generally include a fuel tank 12 fluidly coupled to an internal combustion engine 14 by a fuel supply line 16. A fuel vapor vent line 18 selectively supplies fuel vapor from fuel tank 12 to a purge canister 20 for storage therein. The stored fuel vapor may be subsequently supplied via a purge line 22 to the vehicle engine 14 for combustion therein.

A fuel tank isolation valve assembly 24 can be disposed in fuel vapor vent line 18 to selectively prevent fuel vapor from traveling from the fuel tank 12 to the purge canister 20. Accordingly, the fuel tank isolation valve assembly 24 selectively isolates fuel vapor within the fuel tank 12. In the example embodiment, isolation valve assembly 24 is configured to control vapor flow between the fuel tank 12 and purge canister 20 via an inlet port 26 and an outlet port 28. Inlet port 26 can be fluidly coupled to fuel vapor vent line 18.

Figure 2:
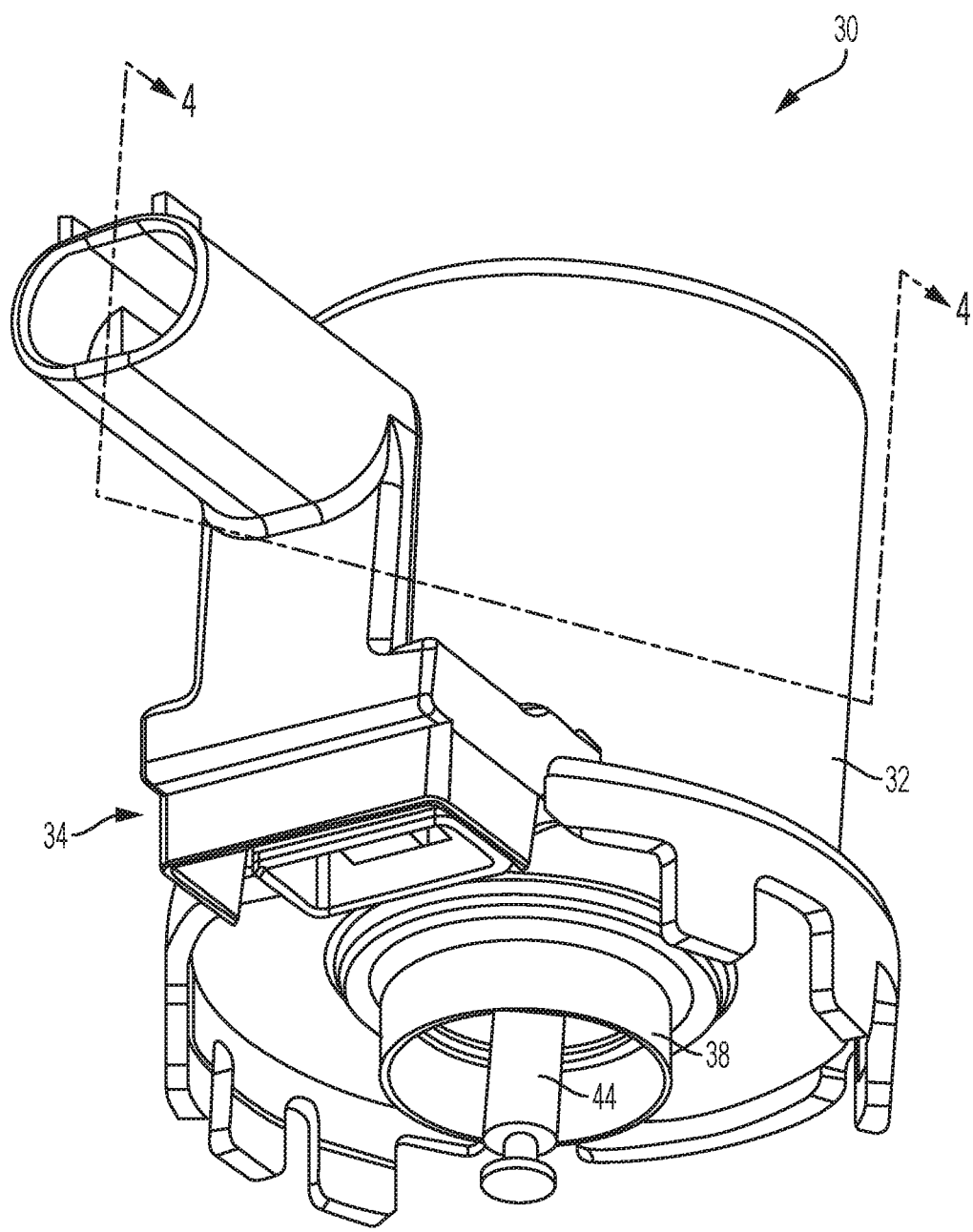
FIG. 2 is a perspective view of a vapor impermeable solenoid assembly that may be used in the system shown in FIG. 1, in accordance to one example of the present disclosure.
Figure 3:
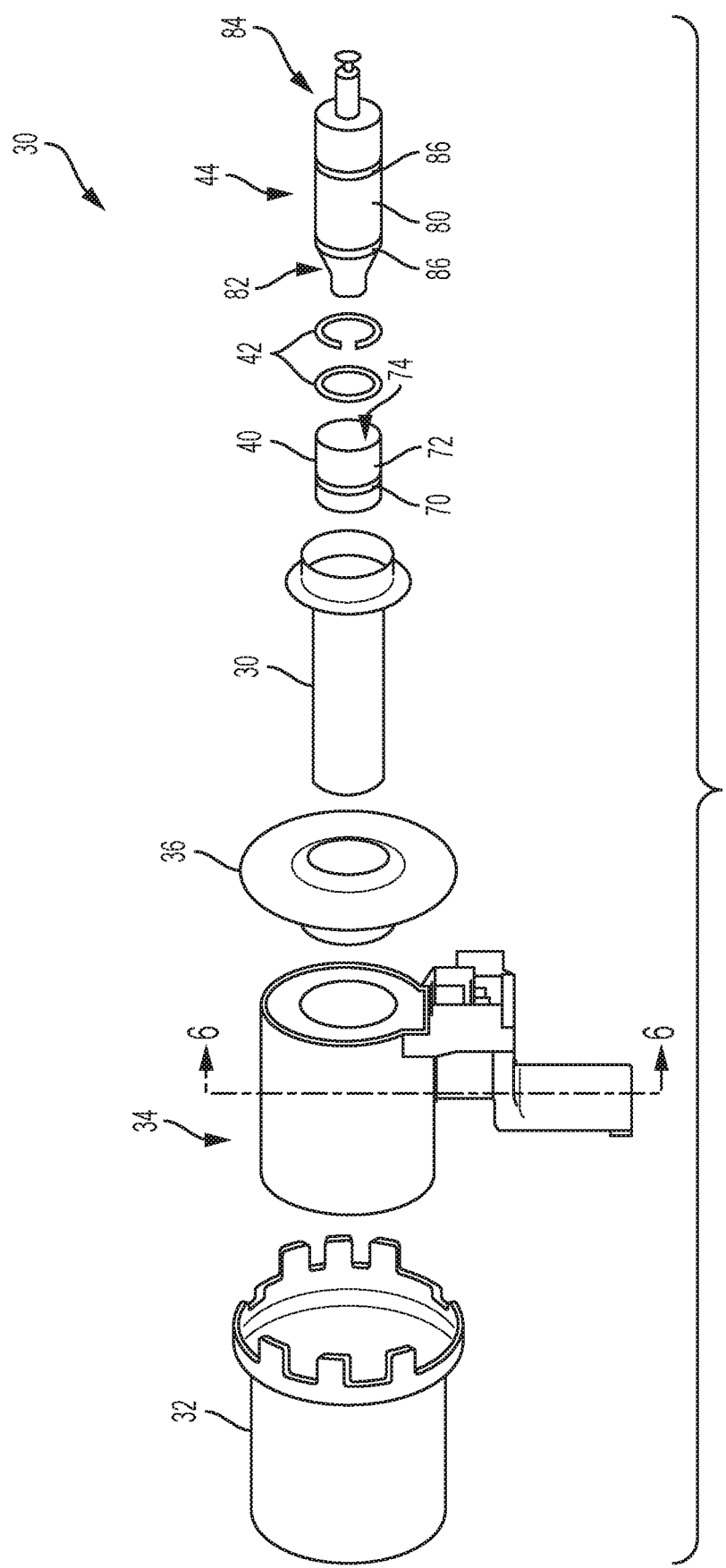
FIG. 3 is an exploded view of the solenoid assembly shown in FIG. 2.
Figure 4:
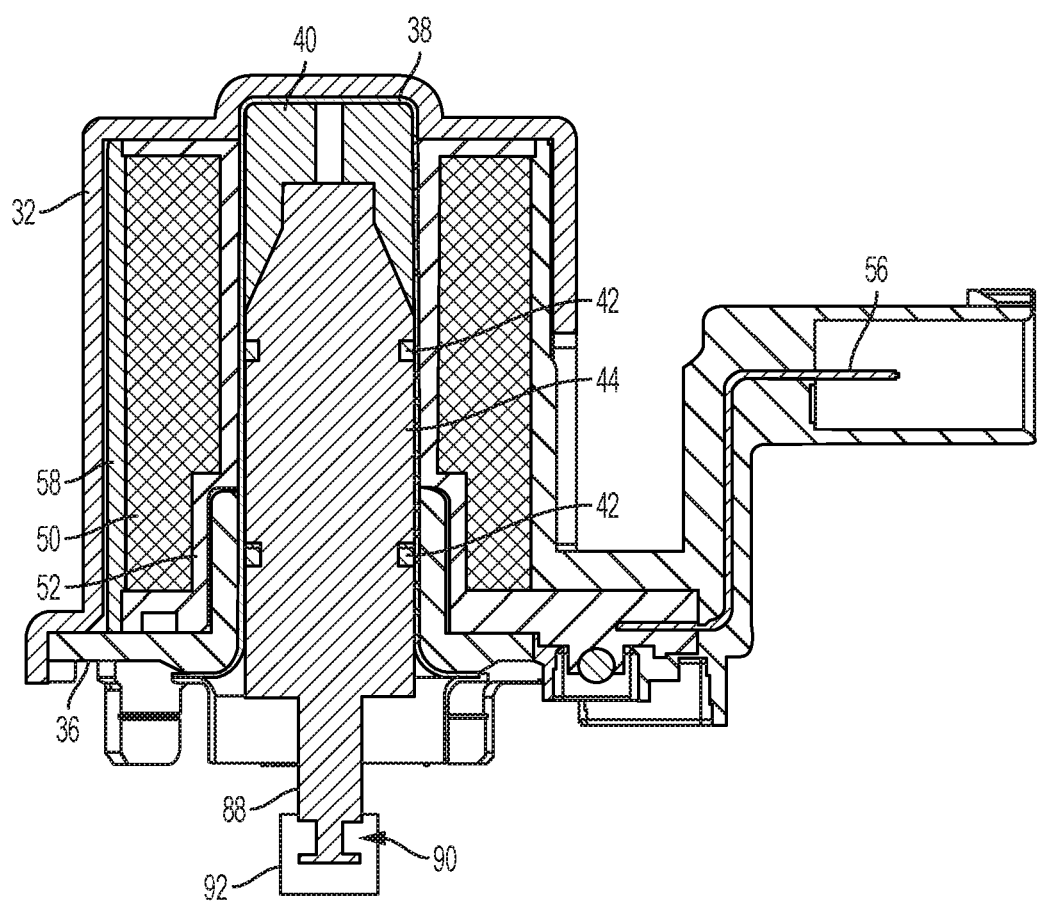
FIG. 4 is a cross-sectional view of the solenoid assembly shown in FIG. 2 and taken along line 4-4.

With further reference to FIGS. 2-4, the fuel tank isolation valve assembly 24 can include a solenoid assembly 30. As shown in FIG. 3, solenoid assembly 30 can generally include an outer housing 32, an encapsulated coil assembly 34, a flux collector 36, an armature tube 38, a pole piece 40, one or more bearings 42, and a magnetic armature 44.

In the example embodiment, the outer housing 32 is a metal liner configured to prevent fuel vapor molecules from passing therethrough. In one example, the outer housing 32 is fabricated from a corrosion resistant material such as stainless steel. However, outer housing 32 may be fabricated from any suitable material that enables housing 32 to function as described herein.

Figure 5:
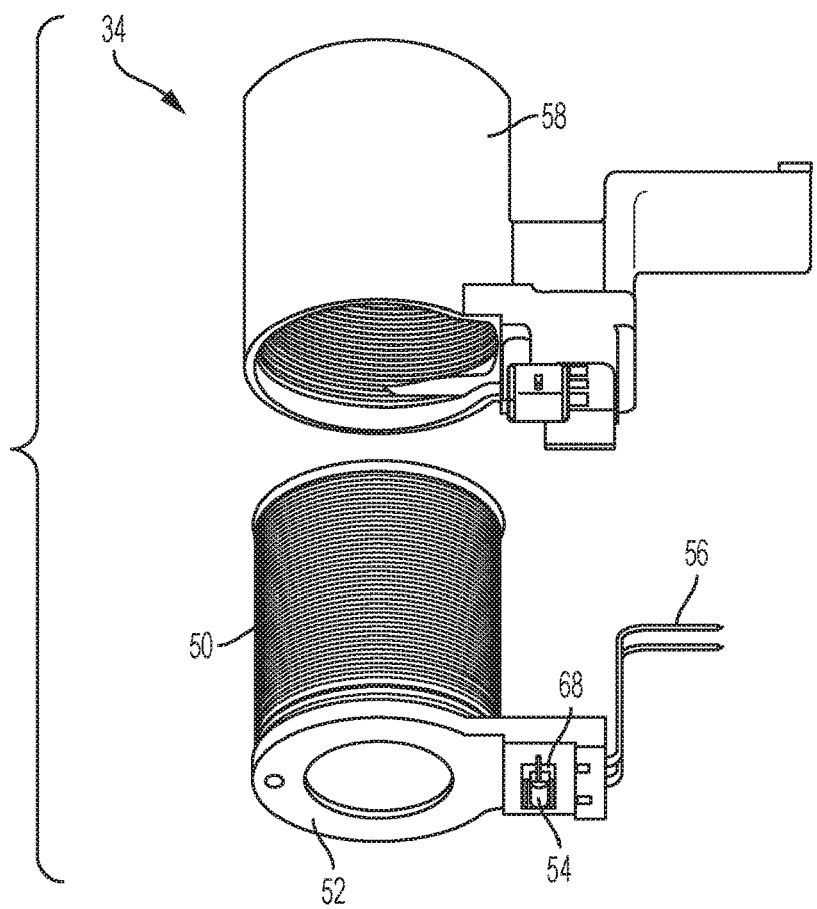
FIG. 5 is an exploded view of an encapsulated coil assembly shown in FIG. 3, in accordance to one example of the present disclosure.
Figure 6:
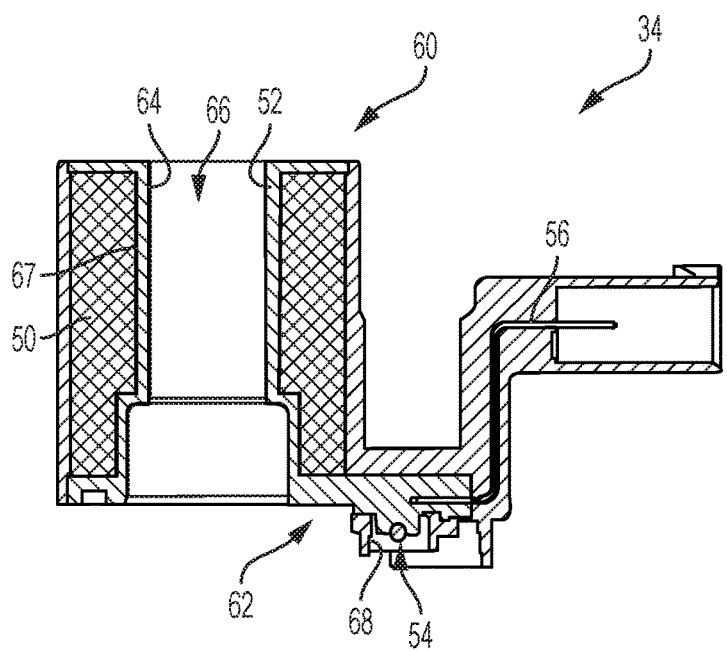
FIG. 6 is a cross-sectional view of the encapsulated coil assembly shown in FIG. 3 and taken along line 6-6.

With additional reference to FIGS. 5 and 6, encapsulated coil assembly 34 is described in more detail. In the example embodiment, encapsulated coil assembly 34 generally includes coils or windings 50, a bobbin 52, a transient voltage suppressor 54, a terminal 56, and encapsulation material 58. Windings 50 may be copper and can be disposed about bobbin 52, which can be configured to support and/or space windings 50, flux collector 36, and/or armature tube 38.

Bobbin 52 can generally include an armature portion 60 and a terminal portion 62. Armature portion 60 includes an inner wall 64 that defines an armature receiving aperture 66, and an outer wall 67 that receives windings 50. Terminal portion 62 includes a recess or pocket 68 that receives voltage suppressor 54, and terminal 56 is inserted into terminal portion 62 for electrically coupling to windings 50. The encapsulation material 58 can then be disposed about the windings 50, bobbin 52, voltage suppressor 54, and terminal 56 once assembled.

In the example embodiment, the flux collector 36 is configured to collect flux at the outer diameter of the housing 32 and route the flux to the magnetic armature 44. The armature tube 38 can be disposed inboard of the bobbin 52 and the flux collector 36. In one example, the armature tube 38 is fabricated from a corrosion resistant material to facilitate preventing a corrosive surface from forming on the inside diameter due to exposure to water dissolved into the fuel. For example, armature tube 38 may be fabricated from a ferritic stainless steel such as alloy 430 SST.

The pole piece 40 can be disposed within an upper portion of the armature tube 38. In one example, the pole piece 40 includes a groove 70 formed in an outer surface 72 thereof. During installation, a portion of the armature tube 38 can be crimped or pressed into the groove 70 to secure the pole piece 40 in a desired location within the armature tube 38. However, alternative methods of securing the pole piece 40 within the armature tube 38 are envisioned (e.g., via welding or fasteners). As shown, pole piece 40 can include a receiving aperture 74 (FIG. 3) configured to selectively receive a portion of the magnetic armature 44. In some examples, receiving aperture 74 can have a shape that is complementary to or generally complementary to a shape of a portion of the magnetic armature 44.

The magnetic armature 44 can be slidably disposed within the armature tube 38 and can generally include a body 80 having a first end 82 and a second end 84. The body 80 can include one or more grooves 86 (FIG. 3) configured to each receive one bearing 42 that facilitates movement of the magnetic armature 44 sliding up and down within the armature tube 38. As discussed herein, the first end 82 can have a shape configured to be received within receiving aperture 74 of pole piece 40. In the illustrated example, receiving aperture 74 and first end 82 can have a frustoconical or generally frustoconical shape. However, receiving aperture 74 and first end 82 can have various shapes and sizes.

The second end 84 can include an arm 88 extending from the body 80. The arm 88 can include a groove 90 or other feature configured to receive a seal or other feature 92 that is configured to block a passage (not shown) and prevent fuel vapor from passing from the fuel tank 12 to the purge canister 20. As such, arm 88 can couple to portions of the fuel tank isolation valve assembly 24, and movement of the armature 44 can selectively unplug conduit 18 to let fuel vapor travel to the purge canister 20.

In operation, the fuel tank isolation valve assembly 24 is generally moved between a sealed position and an unsealed position. In the sealed position, valve assembly 24 prevents fuel vapor from passing from the fuel tank 12 to the purge canister 20. In the unsealed position, the valve assembly 24 enables fuel vapor to pass from the fuel tank 12 to the purge canister. In one example, the valve assembly 24 is in the sealed position by default.

Upon providing electric current to the windings 50 via the terminals 56, a magnetic flux path is induced, which travels up the flux collector 36, across the armature tube 38, and to the armature 44. The magnetic flux causes the armature 44 to close the gap to the pole piece 40, thereby moving the armature 44 upwards and drawing the arm 88 upwards. This movement opens the fuel tank isolation valve assembly 24 and allows fuel vapor to travel to the purge canister 20. In some examples, valve assembly 24 is energized (i.e., moved to the unsealed position) during car refueling (e.g., when the lever pulled to open fuel door) and when the vehicle is transitioned to operating the internal combustion engine 14. The valve assembly 24 may be deenergized (i.e., moved to the sealed position) when, for example, an electric motor (not shown) is being utilized.

Figure 7:
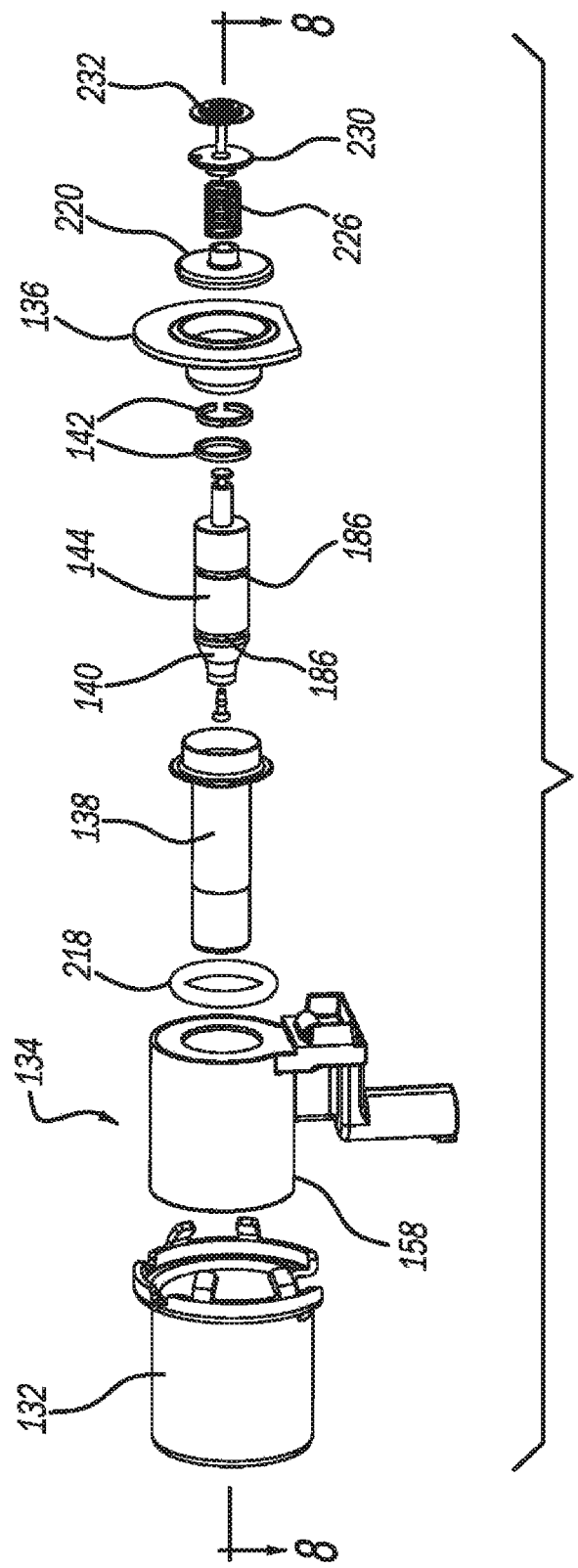
FIG. 7 is an exploded view of a solenoid assembly constructed in accordance to additional features of the present disclosure.
Figure 8:
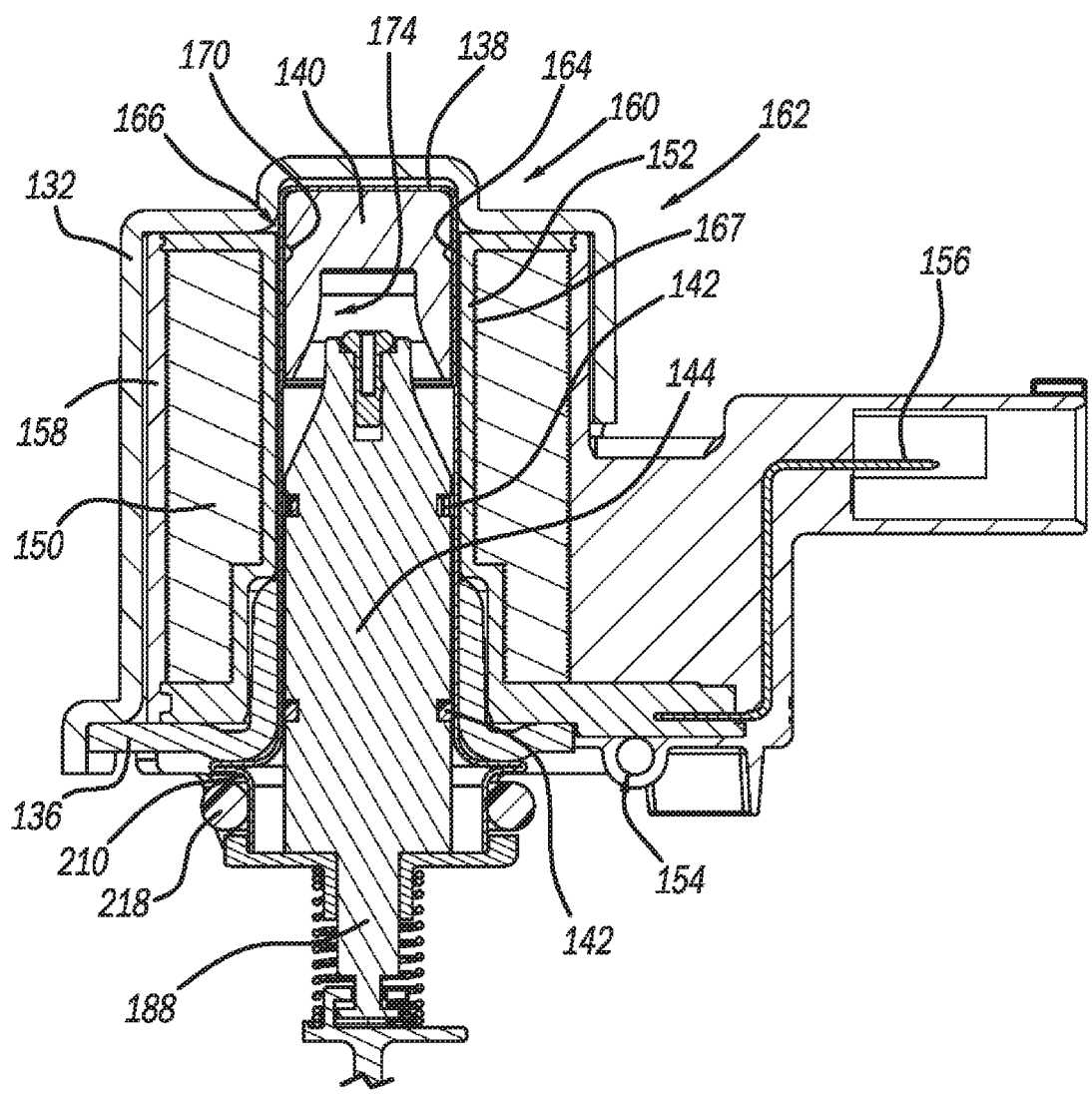
FIG. 8 is a cross-sectional view of the solenoid assembly shown in FIG. 7 and taken along line 8-8.

With reference to FIGS. 7 and 8, a solenoid assembly 130 constructed in accordance to another example of the present disclosure is shown. Unless otherwise described herein, the solenoid assembly 130 operates similar to the solenoid assembly 30. Like components are denoted with like reference numerals increased by 100. The solenoid assembly 130 includes an outer housing 132, an encapsulated coil assembly 134, a flux collector 136, an armature tube 138, a pole piece 140, one or more bearings 142 and a magnetic armature 144. The outer housing 132 is a metal liner configured to prevent fuel vapor molecules from passing therethrough. In one example, the outer housing 132 is fabricated from a corrosion resistant material such as stainless steel. However, outer housing 132 may be fabricated from any suitable material that enables housing 132 to function as described herein.

The encapsulated coil assembly 134 generally includes coils or windings 150, a bobbin 152, a transient voltage suppressor 154, a terminal 156, and encapsulation material 158. Windings 150 may be copper and can be disposed about bobbin 152, which can be configured to support and/or space windings 150, flux collector 136, and/or armature tube 138.

Bobbin 152 can generally include an armature portion 160 and a terminal portion 162. Armature portion 160 includes an inner wall 164 that defines an armature receiving aperture 166, and an outer wall 167 that receives windings 150. Terminal portion 162 receives voltage suppressor 154, and terminal 156 is inserted into terminal portion 162 for electrically coupling to windings 150. The encapsulation material 158 can then be disposed about the windings 150, bobbin 152, voltage suppressor 154, and terminal 156 once assembled.

In the example embodiment, the flux collector 136 is configured to collect flux at the outer diameter of the housing 132 and route the flux to the magnetic armature 144. The armature tube 138 can be disposed inboard of the bobbin 152 and the flux collector 136. In one example, the armature tube 138 is fabricated from a corrosion resistant material to facilitate preventing a corrosive surface from forming on the inside diameter due to exposure to water dissolved into the fuel. For example, armature tube 138 may be fabricated from a ferritic stainless steel such as allow 430 SST. While popular convention would suggest that the armature tube 138 (and 38) should be formed of non-magnetic material, the armature tube 138 (and 38) are formed of magnetic material to yield advantages over the prior art. In this regard, by incorporating an armature tube 138 formed of magnetic material, less copper is required to be used at the windings 150 while still providing equivalent results. As a result, cost savings can be realized with the armature tube 138 (and 38) of the instant application.

The pole piece 140 can be disposed within an upper portion of the armature tube 138. In one example, the pole piece 140 includes a groove 170 formed in an outer surface thereof. During installation, a portion of the armature tube 138 can be crimped or pressed into the groove 170 to secure the pole piece 140 in a desired location within the armature tube 138. However, alternative methods of securing the pole piece 140 within the armature tube 138 are envisioned (e.g., via welding or fasteners). As shown, pole piece 40 can include a receiving aperture 174 (FIG. 8) configured to selectively receive a portion of the magnetic armature 144. In some examples, receiving aperture 174 can have a shape that is complementary to or generally complementary to a shape of a portion of the magnetic armature 144.

The magnetic armature 144 can include one or more grooves 186 configured to each receive one bearing 142 that facilitates movement of the magnetic armature 144 sliding up and down within the armature tube 138. The armature tube 138 can be formed with an o-ring groove 210 for receiving an o-ring 218. A disk 220 can bound the o-ring 218 on an opposite end thereof. A biasing member 226 can bias a frame member 230 and seal 232 away from the disk 220.

Described herein are systems and methods for a fuel vapor impermeable solenoid assembly. The systems include a vapor impermeable housing disposed about an encapsulated coil assembly, a flux collector, an armature tube, a pole piece, and a magnetic armature. The interior cavity of the solenoid assembly can be exposed to fuel vapor without allowing the fuel vapor to escape. Accordingly, the system prevents vapor from permeating the device to the environment.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A vapor impermeable solenoid for a fuel tank isolation valve assembly, the vapor impermeable solenoid comprising:
   an outer housing defining an inner cavity and fabricated from a vapor impermeable material configured to prevent fuel vapor molecules from passing therethrough;
   windings configured to generate a magnetic flux when energized;
   a flux collector configured to direct the magnetic flux;
   an armature tube disposed within the inner cavity inboard of the flux collector and formed of magnetic material;
   a pole piece disposed within the armature tube; and
   a magnetic armature disposed within the armature tube and coupled to a seal configured to selectively seal a passage that allows fuel vapor to pass to a purge canister, the magnetic armature configured to move from a first position to a second position when an electric current is applied to the windings.

2. The vapor impermeable solenoid of claim 1, wherein the first position is a sealed position preventing flow of the fuel vapor to the purge canister, and the second position is an unsealed position allowing flow of the fuel vapor to the purge canister.

3. The vapor impermeable solenoid of claim 1, wherein the magnetic armature includes a first end having a frustoconical shape.

4. The vapor impermeable solenoid of claim 3, wherein the magnetic armature includes a second end having an arm extending therefrom, wherein the seal is coupled to the arm.

5. The vapor impermeable solenoid of claim 1, further comprising an encapsulated coil assembly that includes the windings.

6. The vapor impermeable solenoid of claim 5, wherein the encapsulated coil assembly further includes a bobbin having an armature portion and a terminal portion.

7. The vapor impermeable solenoid of claim 6, wherein the windings are disposed about the armature portion, and a terminal is coupled to the terminal portion, the terminal electrically coupled to the windings.

8. The vapor impermeable solenoid of claim 7, further comprising a voltage suppressor disposed within a recess formed in the terminal portion.

9. The vapor impermeable solenoid of claim 7, further comprising an encapsulation material disposed about and at least partially encapsulating the windings, the bobbin, and the terminal.

10. The vapor impermeable solenoid of claim 6, wherein the armature tube is formed of stainless steel and is disposed inboard of the bobbin.

11. The vapor impermeable solenoid of claim 10, wherein the magnetic armature includes at least one groove formed therein configured to receive a bearing to facilitate sliding movement of the magnetic armature within the armature tube.

12. The vapor impermeable solenoid of claim 1, wherein the armature tube is fabricated from a corrosion resistant metallic material to facilitate preventing a corrosive surface from forming on an inside diameter due to exposure to water dissolved in fuel, and
   wherein the armature tube defines an open end and a closed end, the pole piece being secured inside of and to the armature tube at the closed end.

13. The vapor impermeable solenoid of claim 1, wherein the outer housing is a metal liner configured to prevent fuel vapor molecules from passing therethrough.

14. A fuel tank isolation valve assembly for a fuel tank system having a fuel tank coupled to a purge canister via a fuel vapor vent line, the fuel tank isolation valve assembly comprising:
   a vent passage having a vapor inlet port and a vapor outlet port; and
   a vapor impermeable solenoid assembly operably coupled to the vent passage, the vapor impermeable solenoid assembly comprising:
      an outer housing defining an inner cavity and fabricated from a vapor impermeable material configured to prevent fuel vapor molecules from passing therethrough;
      windings configured to generate a magnetic flux when energized;
      a flux collector configured to direct the magnetic flux;
      an armature tube disposed within the inner cavity inboard of the flux collector and formed of magnetic material;
      a pole piece disposed within the armature tube; and
      a magnetic armature disposed within the armature tube and coupled to a seal configured to selectively seal the vent passage that allows fuel vapor to pass to purge canister, the magnetic armature configured to move from a first position to a second position when an electric current is applied to the windings.

15. The fuel tank isolation valve assembly of claim 14, wherein the first position is a sealed position preventing flow of the fuel vapor to the purge canister, and the second position is an unsealed position allowing flow of the fuel vapor to the purge canister.

16. The fuel tank isolation valve assembly of claim 14, wherein the magnetic armature includes a first end having a frustoconical shape, a second end having an arm extending therefrom, wherein the seal is coupled to the arm.

17. The fuel tank isolation valve assembly of claim 14, further comprising an encapsulated coil assembly that includes the windings, a bobbin having an armature portion and a terminal portion, and an encapsulation material disposed about and at least partially encapsulating the windings, the bobbin, and the terminal, wherein the windings are disposed about the armature portion, and a terminal is coupled to the terminal portion, the terminal electrically coupled to the windings.

18. The fuel tank isolation valve assembly of claim 17, wherein the armature tube is disposed inboard of the bobbin and the flux collector,
wherein the magnetic armature includes at least one groove formed therein configured to receive a bearing to facilitate sliding movement of the magnetic armature within the armature tube.

19. The fuel tank isolation valve assembly of claim 14, wherein the outer housing is a metal liner configured to prevent fuel vapor molecules from passing therethrough.

20. A vehicle fuel tank system comprising:
a fuel tank;
a purge canister;
a conduit fluidly coupling the fuel tank and the purge canister; and
a fuel tank isolation valve assembly disposed within the conduit and configured to selectively fluidly isolate the fuel tank from the purge canister, the fuel tank isolation valve assembly comprising:
a vent passage having a vapor inlet port and a vapor outlet port; and
a vapor impermeable solenoid assembly operably coupled to the vent passage, the vapor impermeable solenoid assembly comprising:
an outer housing defining an inner cavity and fabricated from a vapor impermeable material configured to prevent fuel vapor molecules from passing therethrough;
windings configured to generate a magnetic flux when energized;
a flux collector configured to direct the magnetic flux;
an armature tube disposed within the inner cavity inboard of the flux collector and formed of magnetic material;
a pole piece disposed within the armature tube; and
a magnetic armature disposed within the armature tube and coupled to a seal configured to selectively seal the vent passage that allows fuel vapor to pass to the purge canister, the magnetic armature configured to move from a first position to a second position when an electric current is applied to the windings.

* * * * *